United States Patent [19]

Koff

[11] Patent Number: 5,054,209

[45] Date of Patent: Oct. 8, 1991

[54] CENTRIFUGE FOR DRYING SALAD GREENS AND OTHER FOODS

[76] Inventor: William Koff, 2100 S. Ocean La., Fort Lauderdale, Fla. 33316

[21] Appl. No.: 650,787

[22] Filed: Feb. 5, 1991

[51] Int. Cl.⁵ .............................................. F26B 17/30
[52] U.S. Cl. ..................................... 34/58; 210/360.1; 494/60
[58] Field of Search ................... 34/8, 58; 494/46, 60, 494/62, 63, 84; 210/360.1, 380.1, 781, 784; 426/443, 478

[56] References Cited

U.S. PATENT DOCUMENTS

| | | |
|---|---|---|
| 2,521,054 | 9/1950 | Ellis ........................................ 34/58 |
| 3,300,871 | 1/1967 | O'Conor ................................. 34/58 |
| 3,691,645 | 9/1972 | Nethersell .............................. 34/58 |
| 4,090,310 | 5/1978 | Koff ....................................... 34/58 |
| 4,209,916 | 7/1980 | Doyel ..................................... 34/58 |
| 4,702,162 | 10/1987 | Sontheimer et al. .................. 34/58 |
| 4,742,624 | 5/1988 | Grant ..................................... 34/58 |

Primary Examiner—Henry A. Bennet
Assistant Examiner—Denise L. Gromada
Attorney, Agent, or Firm—Joseph Zallen

[57] ABSTRACT

A food damp-drying centrifuge containing a spinner basket having a cover driven by an upper-positioned motor so that when the cover is engaged with the basket, actuation of the motor causes the basket to spin.

6 Claims, 4 Drawing Sheets

CENTRIFUGE FOR DRYING SALAD GREENS AND OTHER FOODS

BACKGROUND OF THE INVENTION

This invention relates to an improvement in a centrifuge for drying salad greens and other foods in commercial food service establishments. The applicant's prior patent, U.S. Pat. No. 4,090,310 describes a food damp drying centrifuge where the drive motor is affixed to the underside of the housing. This centrifuge operates well but is not economically feasible for small establishments.

One object of this invention is to provide a smaller, less expensive damp drying centrifuge than the prior art.

Further objects of this invention are to provide such a centrifuge which is portable, can be mounted on the wall or used in a sink.

Still another object of this invention is to provide such a centrifuge whose principal parts are easily removed and cleaned.

Other objects and advantages of this invention will be apparent from the description and claims which follow taken together with the appended drawings.

SUMMARY OF THE INVENTION

The invention comprises generally a housing, a hollow, outer basket having a solid side wall and spaced within the housing, a perforated, inner spinner basket spaced within the outer basket and a drive mounted on the upper part of the housing above the baskets. Both baskets are open at the top, having fixed or vertically movable covers supported by the housing, and have lower perforations to provide drainage. The cover for the inner basket is attached to the drive so that when the cover is in place on the inner basket, rotation of the drive rotates the inner basket. Bearing means is provided in the outer basket to support the spinner basket.

When the covers are detached from the basket, the baskets can be removed from the housing and the inner spinner basket be removed from the outer basket. The housing can be used on a sink drain board, on the floor or table or can be wall mounted. If wall mounted, the housing can be half-round. The motor for the drive can be either vertically or horizontally on the top of the housing.

Means are provided to seal the covers to the baskets during operation. In one embodiment of this invention the outer cover is attached to adjustable telescoping vertical supports which form part of the housing. Both covers go up or down together. The inner cover fits either over the spinner basket or is forced into the top opening of the inner basket and acts like a plunger creating frictional contact. This latter form may include a rubber contact portion. For the inner basket to spin, the spinner basket cover and spinner basket are pushed tightly together so that the drive now turns the basket. This can be accomplished by the weight of the upper structure or a latch or means forcing the spinner basket up into engaging position with the spinner basket cover.

It is not necessary that the device be absolutely water-tight as in the prior art, since the motor and drive are mounted on top of the housing. Preferably the outer basket sits on supports attached to a bottom pan.

SPECIFIC EXAMPLES OF INVENTION

Figure 1:
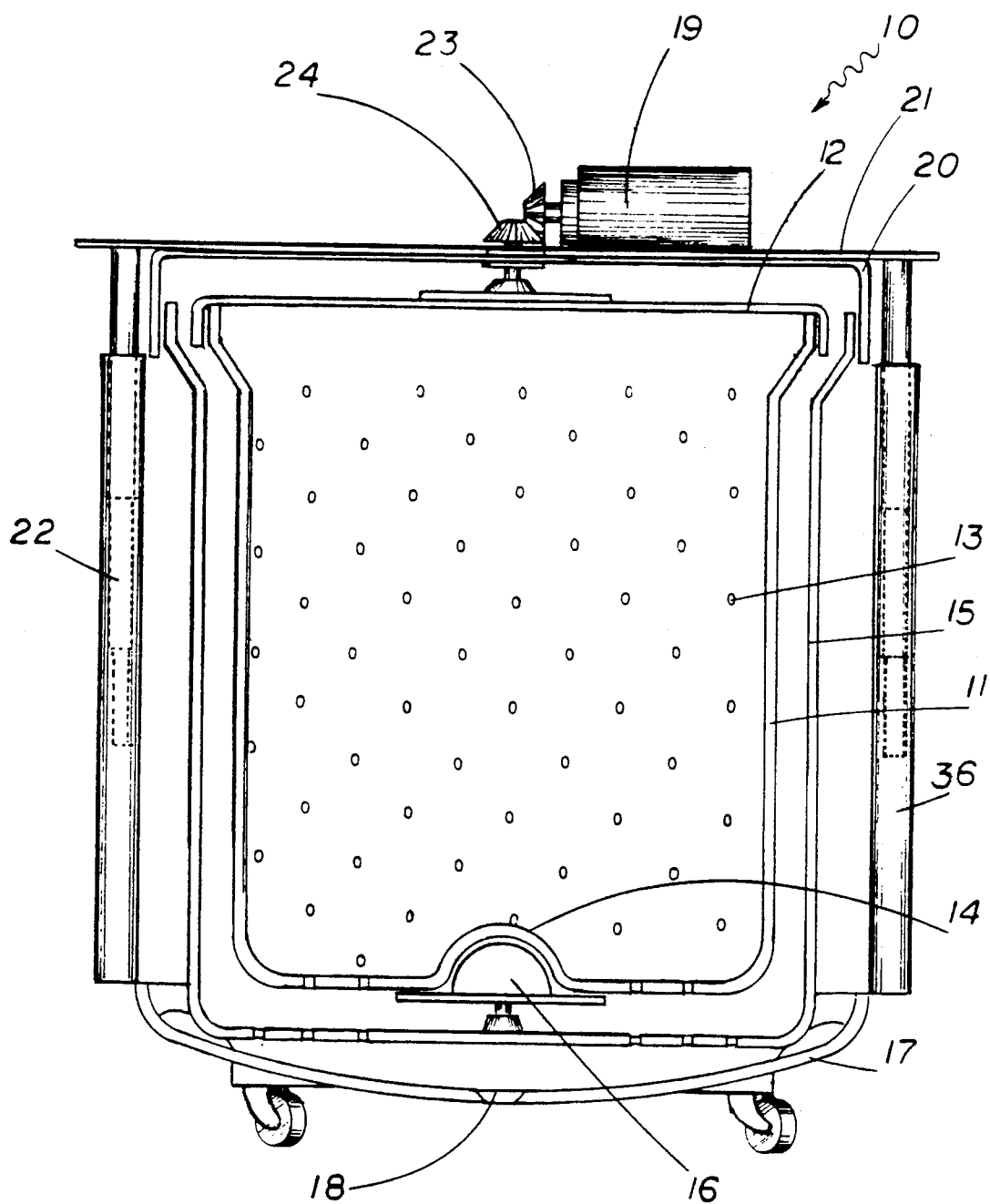
FIG. 1 is a vertical section of one embodiment of this invention.

In the model illustrated in FIG. 1, the spinner basket 11 has a cover 12, perforations 13, and a bottom recess 14. Surrounding the spinner basket is an outer cylindrical container 15 open on top with a solid side wall and bottom perforations. The container 15 has a bearing 16 which registers with the recess 14 in the spinner basket so that the spinner basket revolves on the bearing. The housing has a bottom pan 17 with drain 18, an upper support cross-piece 21 and two telescoping vertical support members with tubes 22a telescoping into tubes 22.

Outer container 15 and inner spinner basket 11 have covers 20 and 12 respectively. The covers are attached to each other and move as a unit. Motor and drive 23 attached to cross-piece 21 has a vertical drive shaft 19 connected to spinner basket cover 12. When the cover 12 is in position on spinner basket 11, rotation of shaft 19 rotates the spinner basket 11. When cross-piece 21 is raised, both covers 12 and 20 are lifted, thus permitting removal of both baskets 11 and 15 as a unit. After they have been removed, basket 11 can be readily removed from basket 15. The openness of the housing permits container 15 and spinner basket 11 to be readily removed or inserted through the side of the device.

Figure 2:
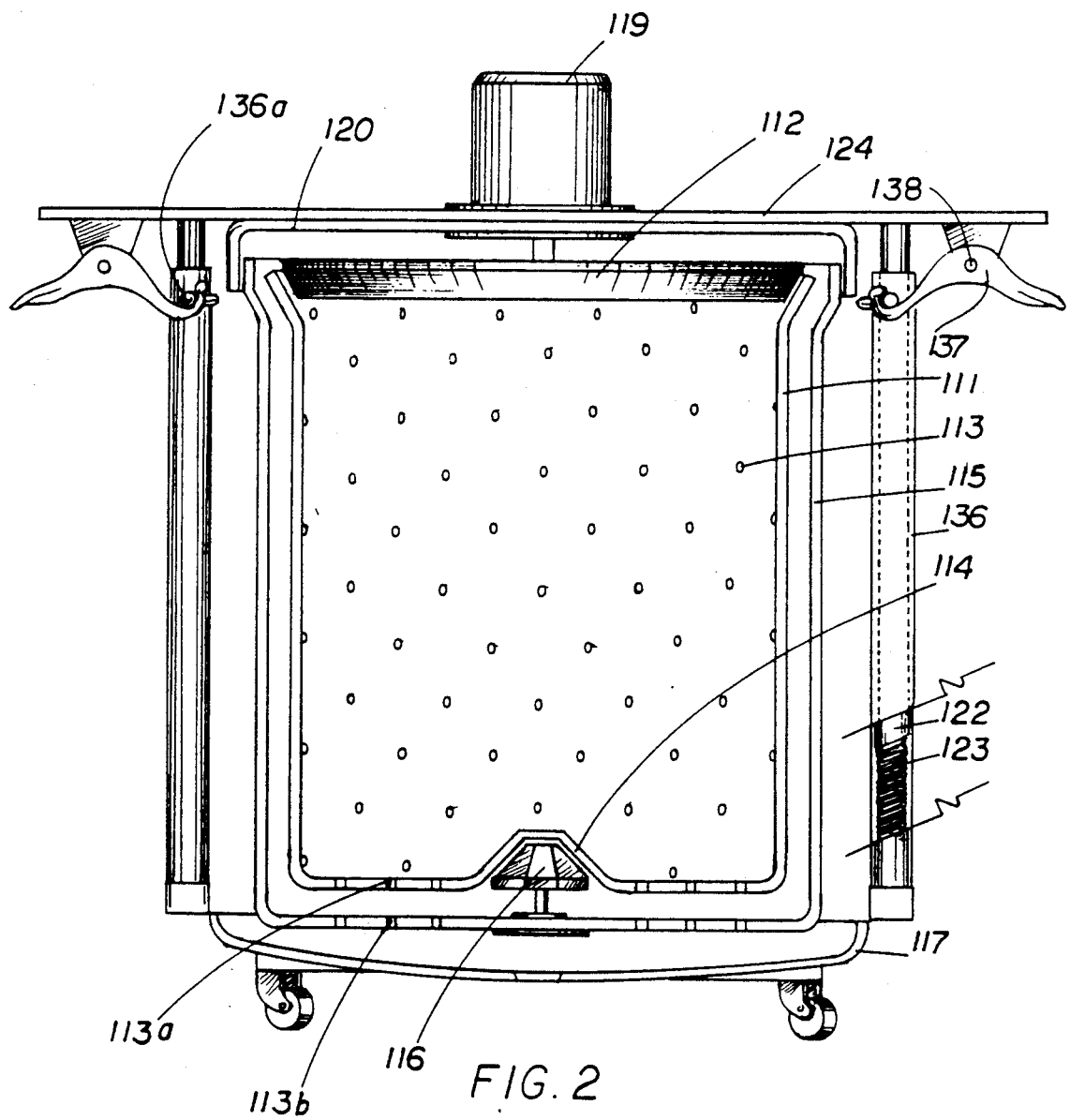
FIG. 2 is a vertical section of another embodiment of this invention.
Figure 3:
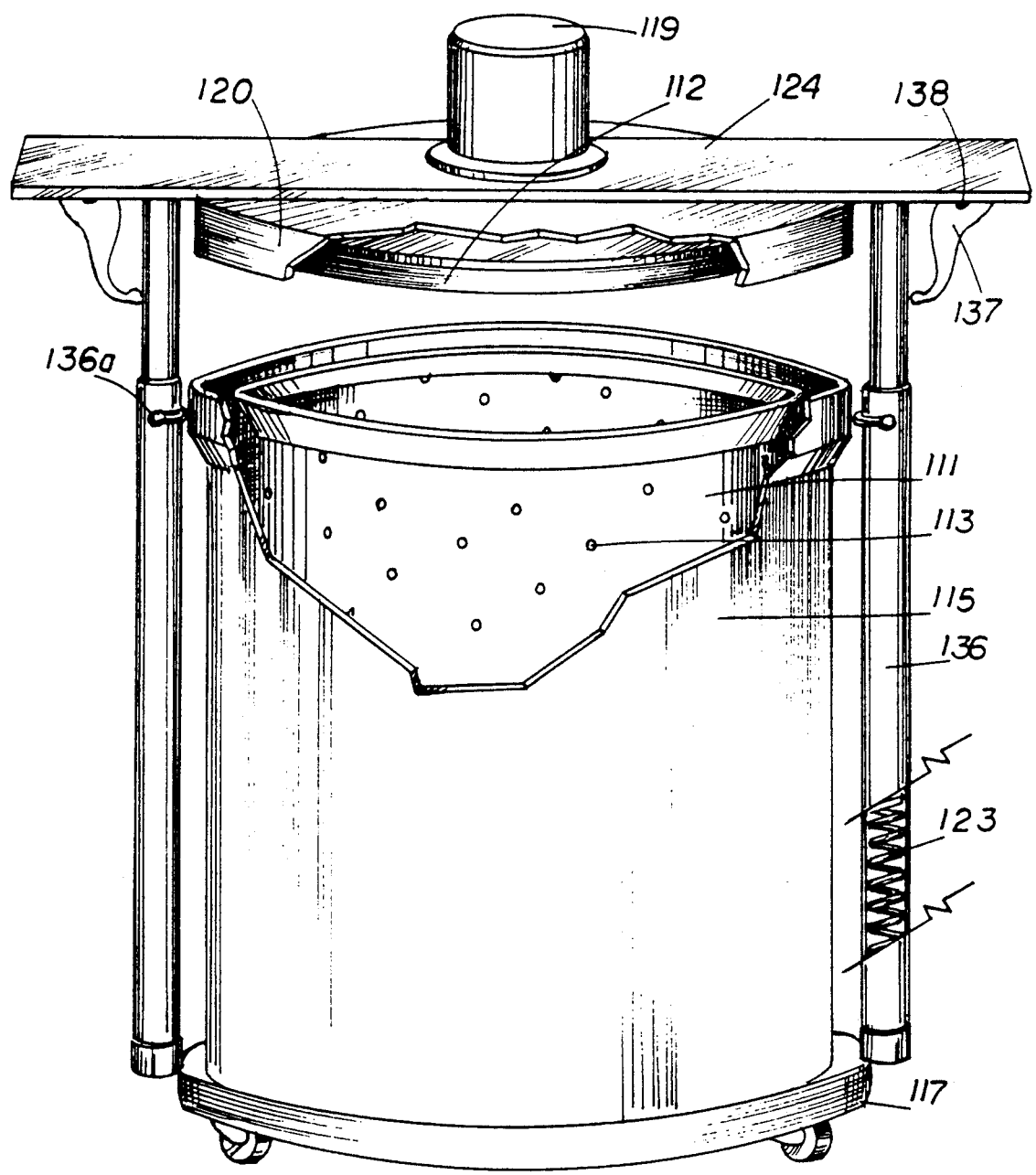
FIG. 3 is a perspective view with partial cutaway of FIG. 2.
Figure 4:
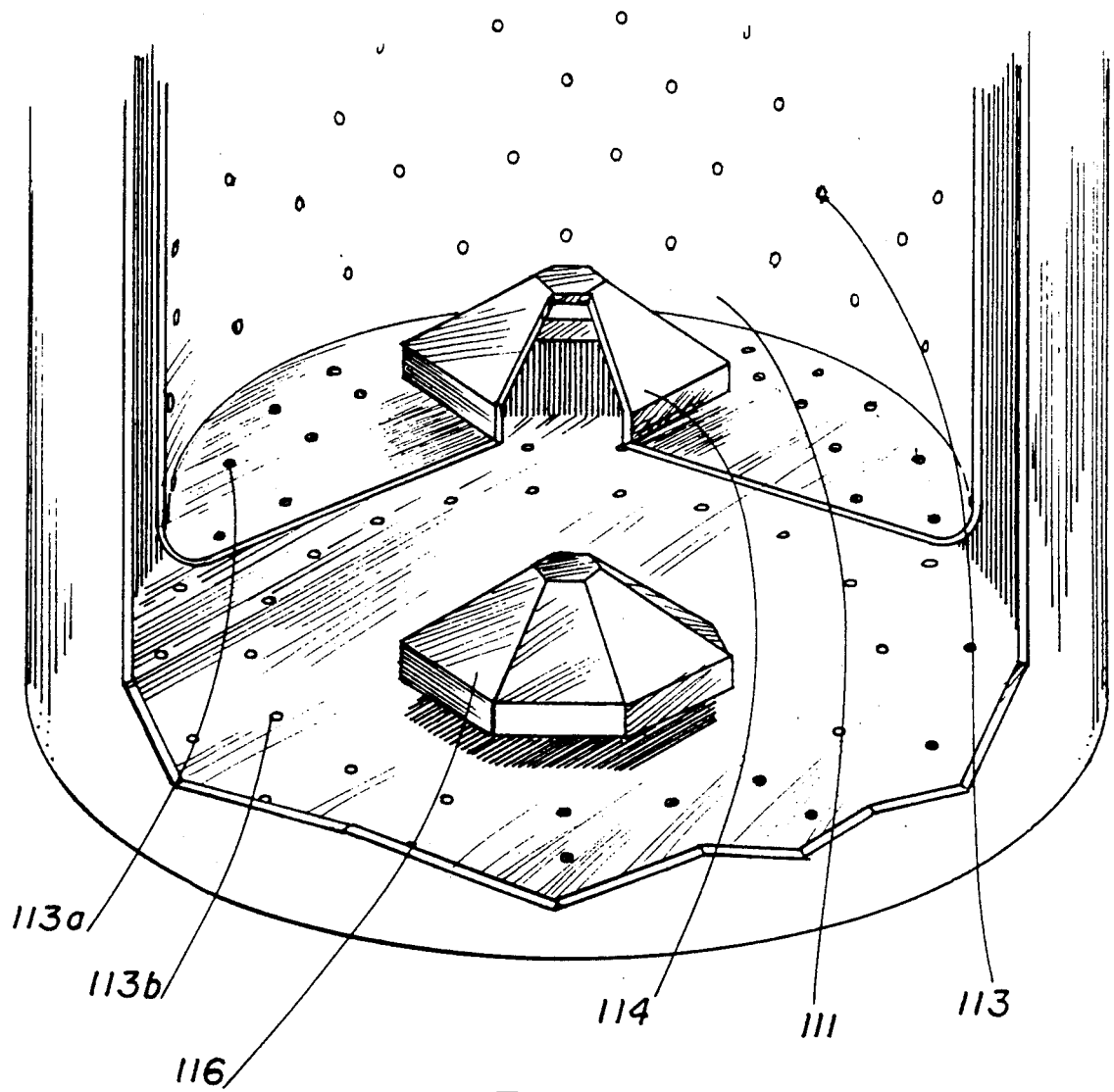
FIG. 4 is a partial cutaway of a portion of FIG. 3.

In the embodiment illustrated in FIGS. 2, 3 and 4 the housing comprises a support platform, vertical telescoping support members 136 comprising an inner rod 136a on a spring 123, and an upper horizontal support member 124. The upper support has a motor 119 with a driveshaft 119a which drives basket cover 112. Basket cover 112 is registrable with the top open end of spinner basket 111. Basket 111 has side wall perforations 113 and a bottom recess 114. Surrounding the spinner basket is a solid side wall container 115 having a rotatable bearing 116 registrable with recess 114 and also a cover 120 attached to upper housing support 124. Support 124 has dependent latches 137 engagable with stops 136a.

I claim:

1. A food damp-drying centrifuge comprising in combination:
    a housing;
    a hollow, body member spaced within said housing and having a solid side wall and bearing means;
    a spinner basket open at its upper end, having perforations in its side wall and coaxially spaced within and supported by said bearing means;
    upper motor drive means supported by said housing;
    cover means for said basket positioned below said drive means; and
    driveshaft means connected to said drive means and attached to said cover means;
    said housing including means for causing said cover means to engage said basket; said centrifuge being characterized in that when said cover means is engaged with said spinner basket, actuation of said drive means causes said basket to spin.

2. A food damp-drying centrifuge comprising in combination:
   a housing;
   a hollow, body member having a solid side wall, being spaced within said housing and having central bearing means;
   a spinner basket open at its upper end, having perforations in its side wall and coaxially spaced within and supported by said bearing means;
   cover means for said body member;
   cover means for said basket; both said cover means being movable;
   upper motor means spaced above both said cover means and supported by said housing; and
   driveshaft means connected to said drive means and attached to said basket cover means;
   said housing including means for causing said basket cover means to engage said basket; said centrifuge being characterized in that when said basket cover means is engaged with said spinner basket, actuation of said drive means causes said basket to spin.

3. A food damp-drying centrifuge comprising in combination:
   a housing comprising bottom support means, ventrally adjustable vertical member means, and top support means connected to and movable with said vertical member means;
   means for locking said top support means in a selected vertical position;
   a hollow body member open at its upper end, having a solid side wall, being spaced within said housing, being supported by said bottom support means and having central bearing means;
   a spinner basket open at its upper end, having perforations in its side wall, coaxially spaced within said body member and supported by said bearing means;
   body member cover means;
   cover means for said basket;
   motor drive means spaced above both said cover means and supported by said top support means; and
   driveshaft means connected to said drive means and attached to said basket cover means;
   said spinner basket cover means being so characterized as being adaptable to fit on the open end of said spinner basket sufficiently snugly in a selected vertical locked position so that said spinner basket and spinner basket cover means will rotate as a unit when said driveshaft rotates said cover means.

4. Claim 3 wherein said body member cover is positioned to cover said body member when said basket cover covers said spinner basket.

5. Claim 3 wherein said vertical member means comprises spring-loaded telescoping members.

6. Claim 5 wherein said locking means comprises hook latches on said upper support means engagable with a stop on said telescoping member.

* * * * *